United States Patent
Magocsi

(10) Patent No.: US 6,386,233 B1
(45) Date of Patent: May 14, 2002

(54) MIXING BATTERY CARTRIDGE WITH AN INCLINED PLANE DISC GUIDE

(75) Inventor: Tamas Magocsi, Monorierdö (HU)

(73) Assignee: Kerox-Multipolar II. KFT., Diosd (HU)

( * ) Notice: Subject to any disclaimer, the term of this patent is extended or adjusted under 35 U.S.C. 154(b) by 0 days.

(21) Appl. No.: 09/647,085

(22) PCT Filed: Mar. 19, 1999

(86) PCT No.: PCT/HU99/00020

§ 371 Date: Nov. 13, 2000

§ 102(e) Date: Nov. 13, 2000

(87) PCT Pub. No.: WO99/49248

PCT Pub. Date: Sep. 30, 1999

(30) Foreign Application Priority Data

Mar. 25, 1998 (HU) .............................................. 9800647

(51) Int. Cl.[7] .............................................. F16K 11/078
(52) U.S. Cl. .............................. 137/625.17; 137/625.4; 137/636.3
(58) Field of Search ..................... 137/625.17, 625.4, 137/636.3; 251/285, 288

(56) References Cited

U.S. PATENT DOCUMENTS

| | | | |
|---|---|---|---|
| 5,331,997 A | * | 7/1994 | Bosio .......................... 137/270 |
| 5,404,911 A | * | 4/1995 | Casas ..................... 137/625.17 |
| 5,660,208 A | * | 8/1997 | Casas ..................... 137/625.17 |
| 6,070,611 A | * | 6/2000 | Becker ..................... 137/625.4 |
| 6,116,279 A | * | 9/2000 | Pawelzik et al. ........ 137/625.4 |
| 6,135,151 A | * | 10/2000 | Bowers et al. ......... 137/625.17 |

FOREIGN PATENT DOCUMENTS

| | | |
|---|---|---|
| DE | 27 39 587 | 3/1979 |
| DE | 29600364 | 4/1996 |
| EP | 0 263 811 | 4/1988 |
| EP | 0 356 402 | 2/1990 |
| EP | 0 356 404 | 2/1990 |
| EP | 0 392 441 | 10/1990 |
| EP | 0 663 551 | 7/1995 |
| EP | 0663551 | 7/1995 |
| GB | 2 136 925 | 9/1984 |
| HU | 183 496 | 10/1986 |
| WO | WO94/21948 | 9/1994 |
| WO | 9514876 | 6/1995 |
| WO | WO95/14876 | 6/1995 |

\* cited by examiner

*Primary Examiner*—John Rivell
*Assistant Examiner*—Meredith H Schoenfeld
(74) *Attorney, Agent, or Firm*—Bachman & LaPointe, P.C.

(57) ABSTRACT

A cartridge used for valve batteries that serve for mixing cold water and warm water, said cartridge having two discs arranged one above the other, namely, a lower inlet disc and an upper regulating disc wherein said discs together form a sealing plane. A driving arm insuring the planar movement of the regulating disc is allowed to be rotated around a fastening pin placed in a lever holder. The driving arm is in driving connection with a ceramic moving element which, in turn, is in driving connection with said regulating disc, and the surfaces of said ceramic moving element, preferably a first ceramic moving surface and a second ceramic moving surface. The surfaces of said ceramic moving element are guided by means of guiding surfaces, preferably a first guiding surface and a second guiding surface, both formed in the lever holder, in a manner that the angle between the direction of movement of the ceramic moving element and the rotation axis of the driving arm differs from 90°.

4 Claims, 5 Drawing Sheets

MIXING BATTERY CARTRIDGE WITH AN INCLINED PLANE DISC GUIDE

BACKGROUND OF THE INVENTION

This invention relates to a cartridge used for valve batteries that serve for mixing cold water and warm water, said cartridge having two discs arranged one above the other, namely, a lower inlet disc and an upper regulating disc that together form a sealing plane together.

For the so-called mixing valve batteries serving for mixing cold- and warm water, so-called cartridges are extensively used, which integrate the ceramic sealing plane discs and driving elements that operate the moving part of the sealing plane in an appropriate manner.

The cartridges of this kind have the advantage that, the valve battery and the cartridge may be produced by different manufacturers, which enables the manufacturer of the valve battery to complete the valve batteries by simply integrating the cartridge supplied by some third person.

A further advantage of the cartridges often used recently is that they can easily be replaced if failed, without disconnecting the water supply to the valve battery; thus, the repair of valve batteries designed with cartridges requires lower cost. A solution of this kind is described in the patent description DE 2739587 C2.

The mixing valve batteries and cartridges were designed in a manner that the ceramic discs of the cartridge inserted into the valve battery were arranged in mid-position relating to each other and, from this position, the regulating disc could be rotated on the inlet disc by the same angle in both directions, by turning the control lever of the valve battery.

If, in this position, the user opens the mixing valve battery by lifting up the operating lever, mixed water of temperature between the cold water inlet temperature and the warm water inlet temperature is discharged from the valve battery.

This means that, if the valve is opened at the mid-position of the operating lever, warm water is also used either required or not.

Should the user set the operating lever to the end position in which cold water is discharged when the valve is opened, this problem would not occur. As a general rule, however, the users set the operating lever of the valve battery to its mid-position, even for the very reason of symmetry, thus resulting in unnecessary use of warm water.

Solutions are known in which the lever of the valve batter is automatically set after each use to the position in which cold water is discharged when the valve is opened; however, these are complex mechanisms and, therefore, cost intensive.

The patent description DE 69306320 T2 describes a solution in which the cold water discharge when opening is achieved by mounting the cartridge of traditional design into the valve battery body turned away in relation to the traditional mounting.

This solution may necessitate the alteration of the valve battery body, on the one hand, and the assembly also requires much care, thus increasing the worktime needed, on the other hand.

SUMMARY OF THE INVENTION

The present invention is aimed at eliminating the unnecessary warm water use by eliminating the above unfavorable features at a low cost.

The objective of the present invention is to develop a cartridge that is suitable to be built in any valve battery body in place of the traditional cartridge and insures that only cold water is discharged when the valve is opened with the operating lever in its mid-position and, mixed water or warm water is drawn only by turning the operating lever of the valve battery away from its mid-position.

The task according to the invention is solved by means of a cartridge used for mixing liquids, especially warm water and cold water, which has an inlet disc and a regulating disc serving for the regulation of the ratio and flow of liquids flowing therethrough, where the two discs are arranged one above the other and form a sealing plane together; said inlet disc being fixed within the cartridge and the regulating disc mounted so as to allow same to be displaced and rotated on the inlet disc, and the driving arm that insures the planar movement of the regulating disc, and is allowed to be rotated around a fastening pin placed in a lever holder, is in driving connection with a ceramic moving element which, in turn, is in driving connection with said regulating disc, and the surfaces of said ceramic moving element, preferably, a first ceramic moving surface and a second ceramic moving surface, are guided by means of guiding surfaces, preferably a first guiding surface and a second guiding surface, both formed in a lever holder, in a manner that the angle between the direction of movement of the ceramic moving element and the driving arm rotation axis differs from 90°.

BRIEF DESCRIPTION OF THE DRAWINGS

The cartridge according to the invention is described below in detail, based on the drawings annexed.

In the drawings.

DETAILED DESCRIPTION OF PREFERRED EMBODIMENTS

Figure 1:
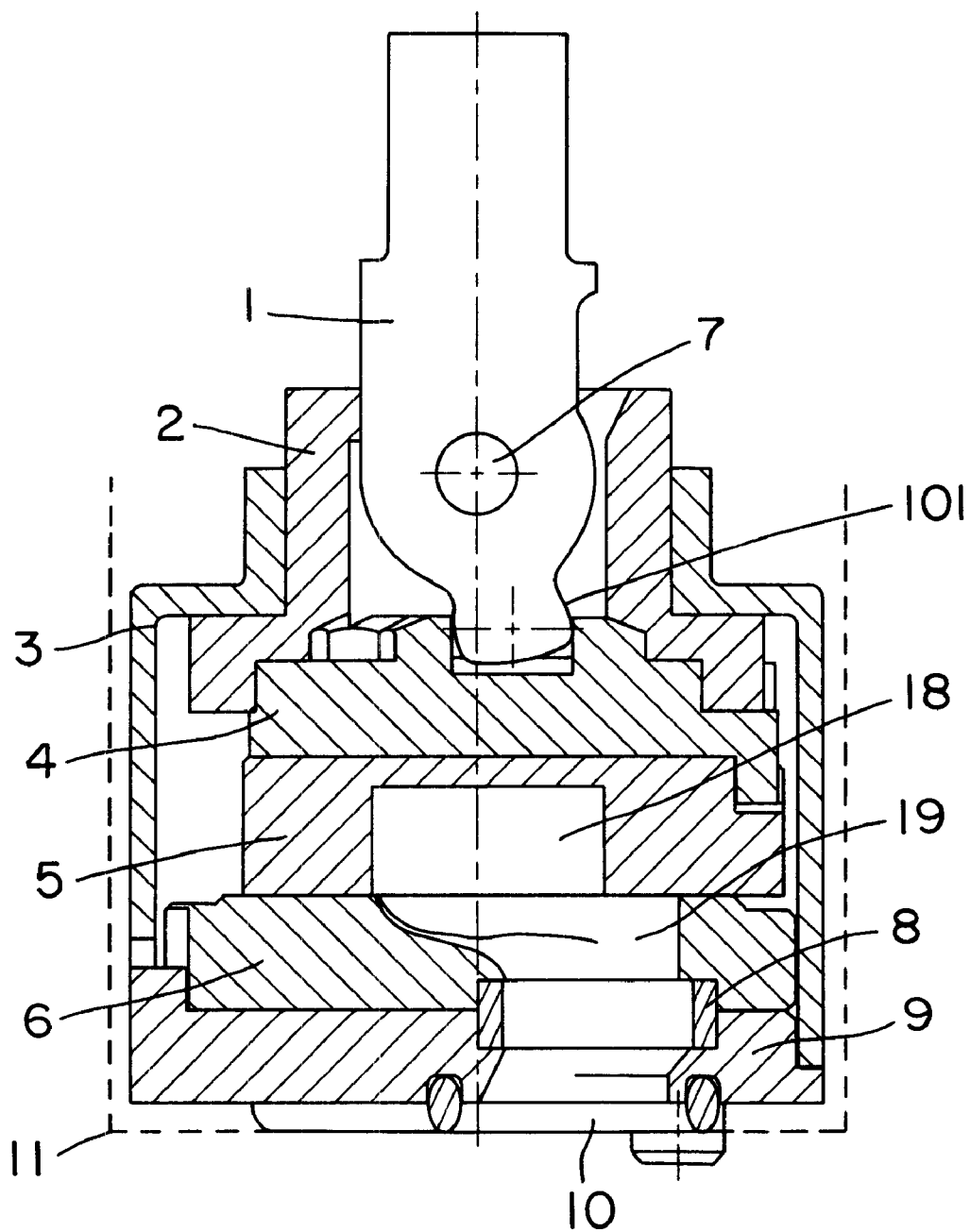
FIG. 1 shows an exemplary embodiment of the cartridge according to the invention in side sectional view.

The side sectional view of the embodiment of the cartridge according to the invention as shown is described based on FIG. 1. The inlet disc 6 serving for inlet of cold water and warm water and outlet of the mixed water is arranged in the casing 3, where the space in contact with water is isolated from the environment by means of the rubber sealing 8.

In the valve battery body 11, the sealing 10 that makes the casting 3 leak proof is arranged to isolate the water flow through the cartridge.

Above the inlet disc 6, the regulating disc 5 is arranged that can be displaced along the surface of said inlet disc 6, the rotation of which controls the mixing ratio of cold- and warm water while its displacement controls and shuts off the outlet water flow, respectively. The regulating disc 5 and the inlet disc 6 together form a plane sealing, and their surfaces in contact are polished.

The regulating disc 5 is in driving connection with the ceramic moving element 4 which, in turn, is in driving connection with the driving arm 1.

The driving arm 1 is supported by means of the fastening pin 7 in the lever holder 2 so as to allow its rotation. The lever holder 2 together with the driving arm 1 fixed in it by means of the fastening pin 7 is arranged in the casing 3 so as to allow its rotation around the median axis of the casing 3.

On the lower part of the driving arm 1, the cylindrical surface 101 is formed, to establish the driving connection between the driving arm 1 and the ceramic moving element 4.

Figure 2:
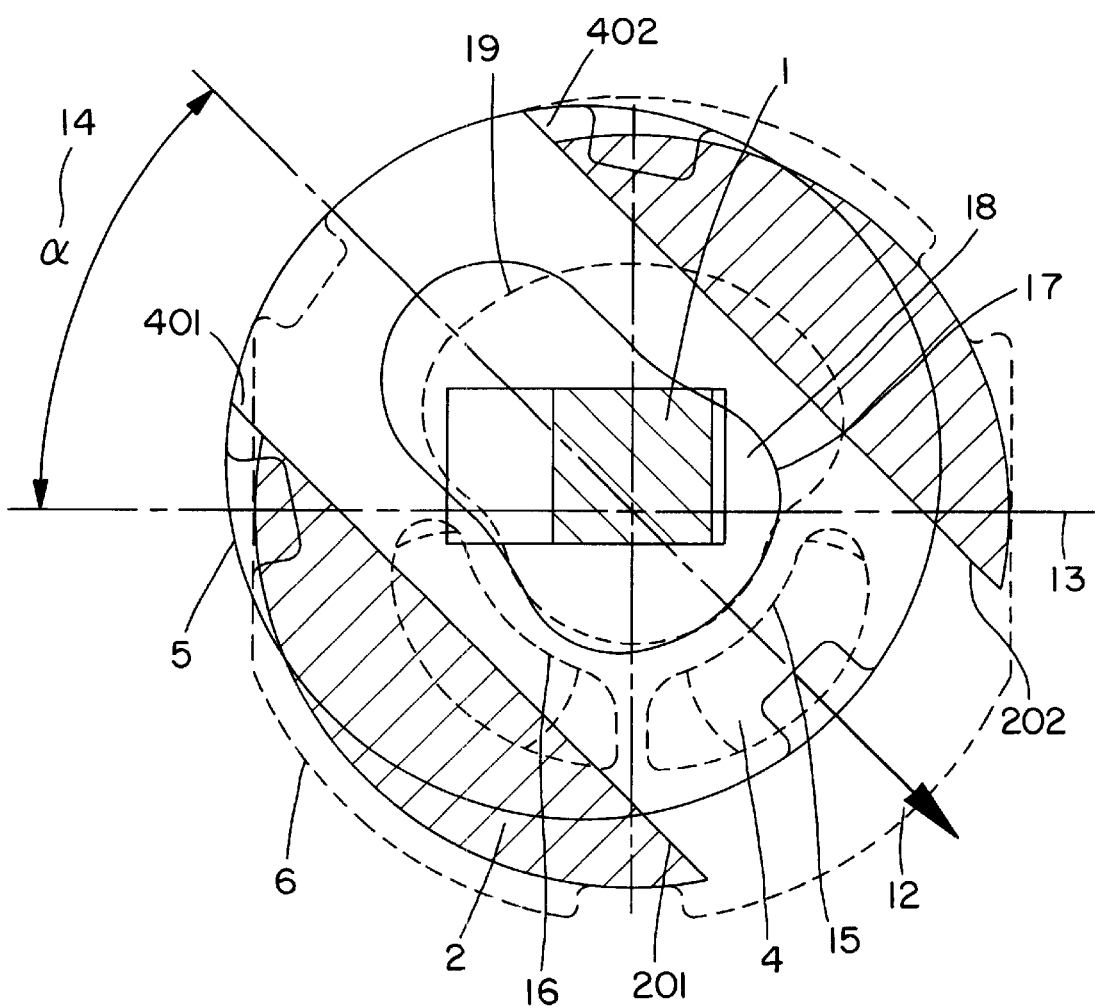
FIG. 2 shows the top sectional view of an exemplary embodiment of the cartridge according to the invention, with the driving arm in its mid-position.
Figure 3:
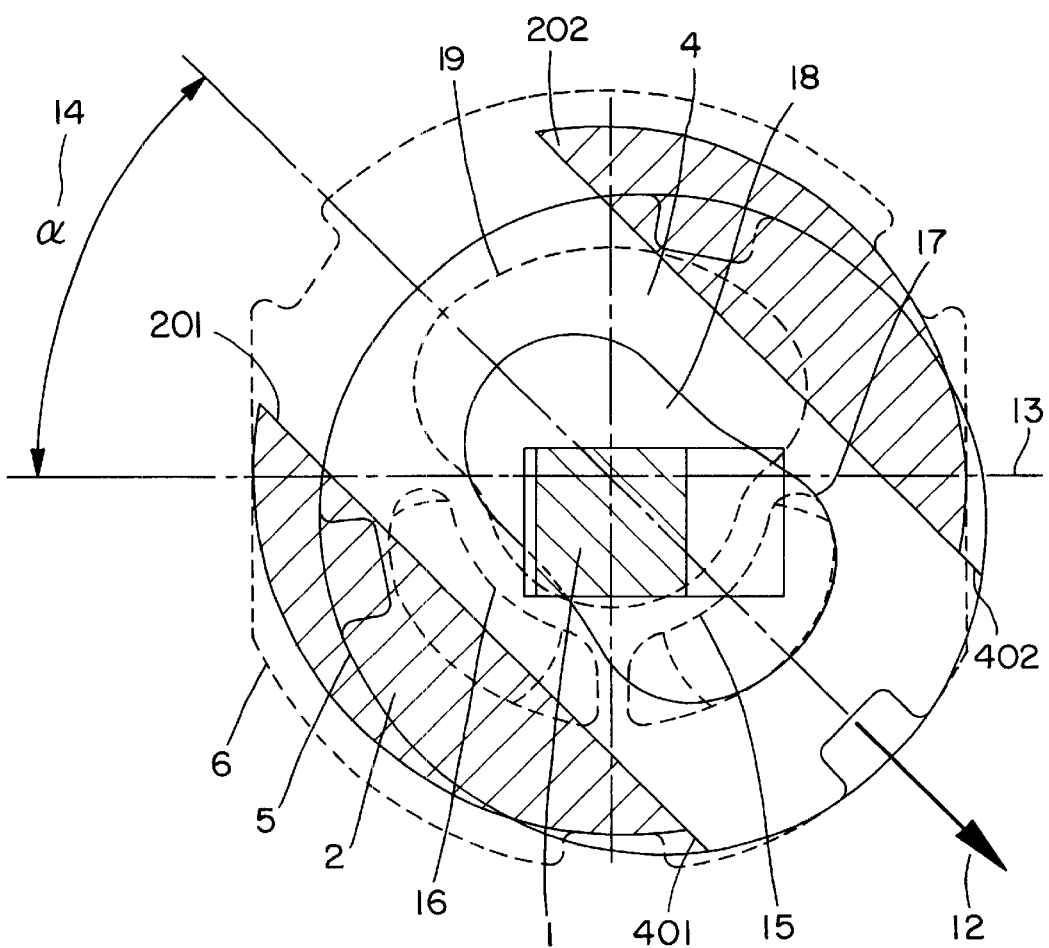
FIG. 3 shows the top sectional view of an exemplary embodiment of the cartridge according to the invention in open position, with the driving arm in its mid-position.
Figure 4:
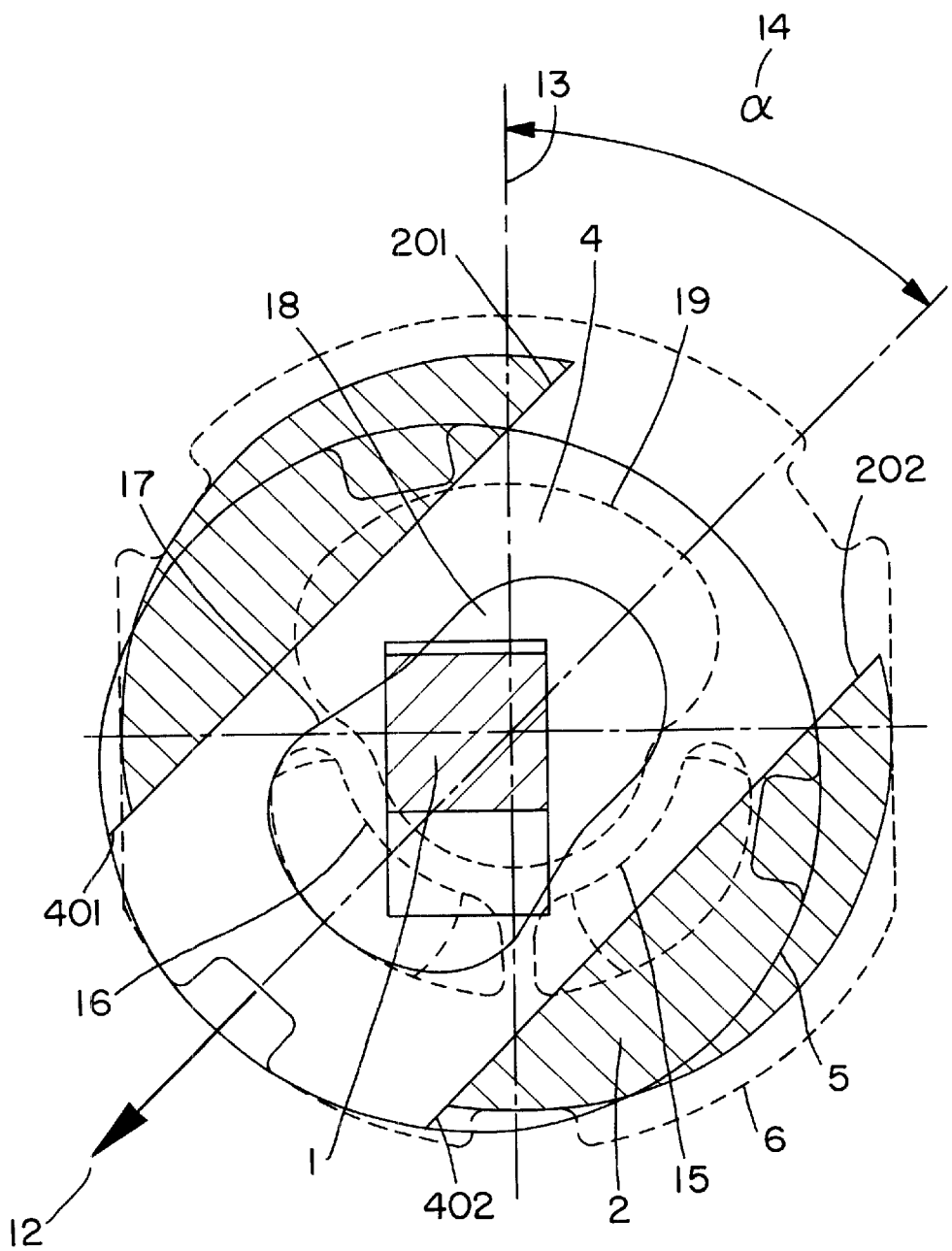
FIG. 4 shows the top sectional view of an exemplary embodiment of the cartridge according to the invention in open position, with the driving arm turned away.
Figure 5:
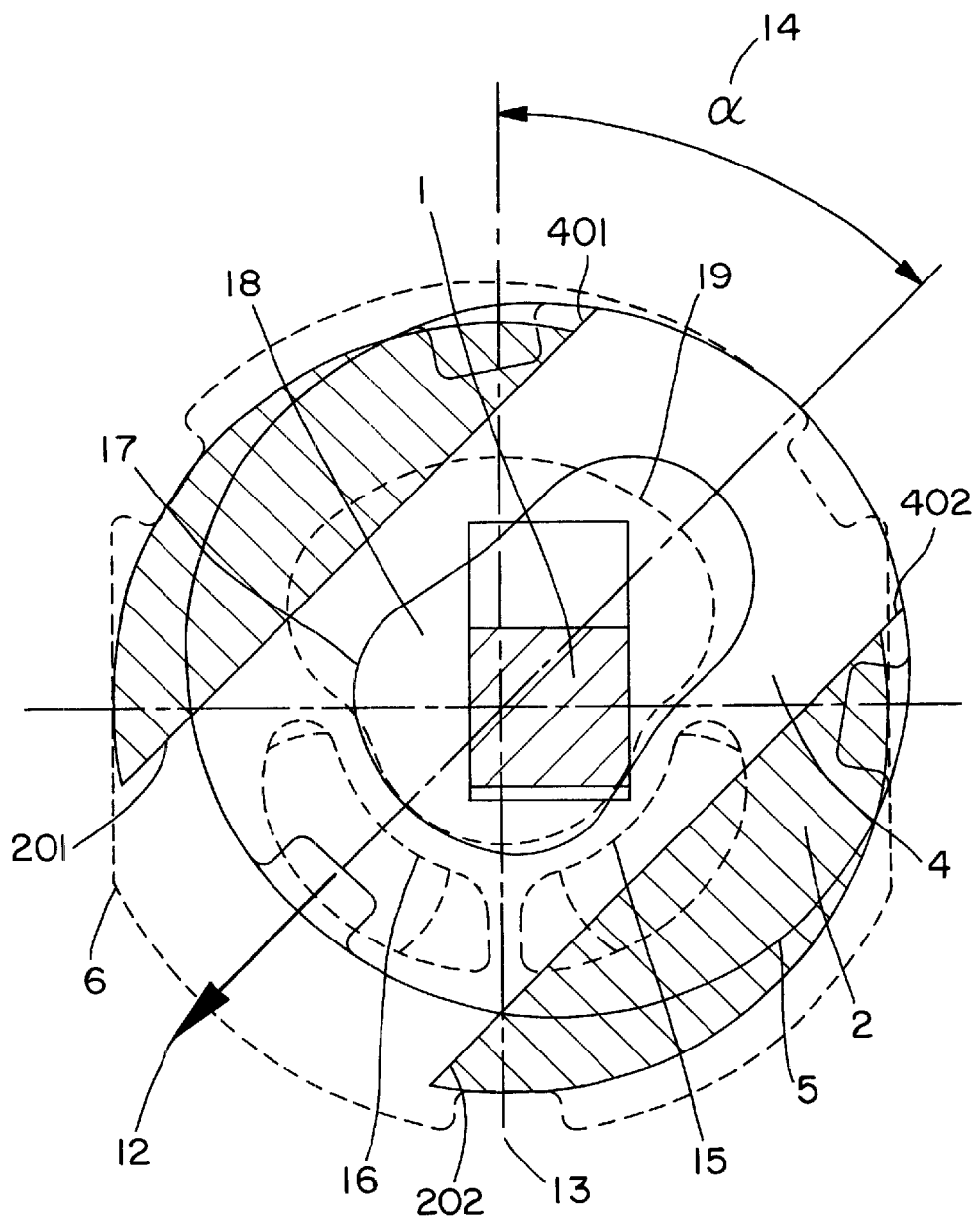
FIG. 5 shows the top sectional view of an exemplary embodiment of the cartridge according to the invention in closed position, with the driving arm turned away.

FIGS. 2 to 4 show the sectional view of the driving arm 1, the lever holder 2 and the ceramic moving element 4, with the regulating disc 5 and the inlet disc 6 forming a sealing plane also represented with dotted line.

The displacement of the regulating disc 5, i.e. its rotation and sliding corresponds to the displacement of the ceramic moving element 4.

In the inlet disc 6, the cold water inlet opening 15 and the warm water inlet opening 16 are formed, as well as the mixed water outlet opening 19.

In the regulating disc 5, the bridging chamber 18 is formed, the rim of which facing the cold water inlet opening 15 and the warm water inlet opening 16 forms the control edge 17 of regulating disc.

In the position shown in FIG. 2, the inlet disc 6 is arranged and designed, respectively, symmetrically to the direction of displacement of driving arm 1 while the regulating arm 5 is arranged and designed, respectively, symmetrically to the direction of movement 12 of the ceramic moving element 4.

In the traditional design, the median axis of the ceramic moving element 4 and that the regulating disc 5 in their base position coincide with the direction of displacement of the driving arm 1.

FIG. 2 shows that, on the ceramic moving element 4, a first ceramic moving surface 401 and a second ceramic moving surface 402 are formed, guided by the first guiding surface 201 and the second guiding surface 202 formed in the lever holder 2.

If the upper part of the driving arm 1 is displaced in opening direction, its part below the fastening pin 7 displaces in the opposed direction, downwards as shown in FIG. 2, thereby causing the ceramic moving element 4 also to move downwards.

When the driving arm 1 is moved, the cylindrical surface 101 on the driving arm in the ceramic moving element 4 displaces towards the axis of the fastening pin 7; thus, the appropriate joining path shall be insured. The displacement component perpendicular to the axis of the fastening pin 7 is insured by the rotation of driving arm 1 around the fastening pin 7.

The direction of displacement of the ceramic moving element 4, however, differs from that of the driving arm 1 depending on the angle 14, between the direction of movement of the ceramic moving element and the rotation axis of driving arm; in fact, the first ceramic moving surface 401 slides along the first guiding surface 201 of the lever holder 2, thus, the ceramic moving element 4 moves in the direction of movement 12 of ceramic moving element, while the relative position of the driving arm 1 and the ceramic moving element 4 alters as shown in FIG. 3.

As a result of displacement of the ceramic moving element 4 to an extent determined by the displacement of driving arm 1, the bridging chamber 18 formed in the inlet disc 6 establishes a passage between the cold water inlet 15 opening and the mixed water outlet opening 19, thereby causing cold water to flow out of the outlet opening of the valve battery that accommodates the cartridge.

It is emphasized again that, under this condition, the driving arm 1 is in its mid-position and the cold water outlet flow is determined by the rotation angle of driving arm 1 in the vertical plane.

Thus, when the user opens the mixing valve battery with the driving arm 1 in its base position, cold water is discharged any time. To drain mixed or warm water, the user shall turn away the driving arm 1 by actuating the connected operating lever of the valve battery. The bridging chamber 18 formed in the regulating disc 5 connects the warm water inlet opening 16 and the mixed water outlet opening 19 both formed in the inlet disc 6 to an extent depending on the rotation angle of the driving arm 1.

Accordingly, both cold- and warm water get into the bridging chamber 18 and the mixed water is discharged through the mixed water outlet opening 19.

The driving arm 1, together with the connected lever holder 2 and the ceramic moving element 4 can be rotated to an extent that the passage between the cold water inlet opening 15 and the mixed water outlet opening 19 both formed in the inlet disc 6 is closed; in fact, the planar part of the regulating disc 5 closes the cold water inlet opening 15 formed in the inlet disc 6. Under this condition, the bridging chamber 18 formed in the regulating disc 5 is able to establish a passage exclusively between the warm water inlet opening 16 and the mixed water outlet opening 19 both formed in the inlet disc 6, to an extent depending on the rotation angle of the driving arm 1 in the vertical plane.

In this case, however, the position of the driving arm 1 differs from its mid position; thus, if the warm water drain is closed, the valve battery shows an asymmetric appearance. Based on the experience, it is expected that the user sets the driving arm 1 and the associated actuating lever of the valve battery, respectively, into its symmetric mid-position.

Thus, the next operating cycle can be started with cold water outlet again.

The rotation components around the two axes are independent of each other; thus, any combination in the relative position of the regulating discs can be implemented, which allows the cartridge to be used in any position, depending on the needs for flow or temperature.

By turning the driving arm 1 of the cartridge from its position shown in FIG. 2 around the median axis of the casing 3 of cartridge, the cartridge remains closed.

The bi-directional rotation of the driving arm 1 of the cartridge is limited by stops arranged in the cartridge.

The cold water inlet opening 15 and the warm water inlet opening 16 are interchangeable; in such cases, the operation of the cartridge is inverted in respect of cold water and warm water side.

The advantage of the cartridge according to the invention is that the cartridge of simple mechanical design and interchangeable with the traditional cartridges results in significant saving in warm water quantity; therefore, its use is favorable in respect of both environmental protection and energy economy.

Of course, the scope of protection relating to the solution according to the invention is not limited to the embodiment described herein; instead, all the modifications and alterations obvious to specialists within the scope of the present invention are also covered.

What is claimed is:

1. Cartridge used for valve batteries that serve for mixing cold water and warm water, which comprises: an inlet disc and a regulating disc serving for the regulation of the ratio and flow of liquids flowing therethrough, wherein said discs are arranged one above the other and form a sealing plane together; said inlet disc being fixed within the cartridge and said regulating disc being mounted so as to allow it to be displaced and rotated on the inlet disc; a driving arm that insures the planar movement of the regulating disc and is allowed to be rotated around a fastening pin placed in a lever holder; wherein said driving arm is in driving connection with a ceramic moving element which, in turn, is in driving connection with said regulating disc; wherein the surfaces of said ceramic moving element are guided by means of guiding surfaces in a manner such that the angle between the direction of movement of the ceramic moving element and the rotation axis of the driving arm differs from 90°.

2. Cartridge according to claim 1, wherein said surfaces of said ceramic moving element comprise a first ceramic moving surface and a second ceramic moving surface.

3. Cartridge according to claim 2, wherein said surfaces of said ceramic moving element are guided by means of a first guiding surface and a second guiding surface.

4. Cartridge according to claim 3, wherein the first and second guiding surfaces are formed in the lever holder.

* * * * *